(12) United States Patent
Simard

(10) Patent No.: US 7,837,205 B2
(45) Date of Patent: Nov. 23, 2010

(54) SHOPPING CART AND COLLAPSIBLE COMPARTMENT THEREOF

(75) Inventor: Gilles Simard, Repentigny (CA)

(73) Assignee: Cari-All Products Inc., Pointe-aux-Trembles, Quebec (CA)

( * ) Notice: Subject to any disclaimer, the term of this patent is extended or adjusted under 35 U.S.C. 154(b) by 500 days.

(21) Appl. No.: 12/073,301

(22) Filed: Mar. 4, 2008

(65) Prior Publication Data
US 2008/0217877 A1  Sep. 11, 2008

Related U.S. Application Data

(60) Provisional application No. 60/904,899, filed on Mar. 5, 2007.

(51) Int. Cl.
*B62D 39/00* (2006.01)

(52) U.S. Cl. ............................ 280/33.993; 280/33.996; 280/33.997

(58) Field of Classification Search ............ 280/33.991, 280/33.992, 33.993, 33.996, 33.997, 47.34, 280/47.35, 47.38, 47.4
See application file for complete search history.

(56) References Cited

U.S. PATENT DOCUMENTS

| 4,065,142 | A | * | 12/1977 | Rehrig | ................ 280/33.993 |
| 4,273,346 | A | | 6/1981 | Rehrig | |
| 4,423,882 | A | | 1/1984 | Stover et al. | |
| 4,471,970 | A | * | 9/1984 | Trubiano | ................ 280/33.993 |
| 4,537,413 | A | | 8/1985 | Rehrig | |
| 5,109,573 | A | | 5/1992 | Sherman | |
| 5,348,323 | A | * | 9/1994 | Trubiano | ................ 280/33.993 |
| 5,368,318 | A | | 11/1994 | Rehrig et al. | |
| 5,458,347 | A | | 10/1995 | Chiv | |
| 5,651,557 | A | | 7/1997 | De Stefano | |
| 6,540,240 | B2 | * | 4/2003 | Nadeau et al. | ......... 280/33.993 |
| 6,932,363 | B2 | | 8/2005 | D'Angelo | |
| 6,966,565 | B1 | * | 11/2005 | Ryan et al. | ............. 280/33.992 |
| 2004/0090024 | A1 | * | 5/2004 | Duchene et al. | ........ 280/33.993 |

* cited by examiner

*Primary Examiner*—J. Allen Shriver, II
*Assistant Examiner*—John R Olszewski
(74) *Attorney, Agent, or Firm*—The Nath Law Group; Jerald L. Meyer

(57) ABSTRACT

The invention concerns a collapsible compartment of a shopping cart comprising a seat panel for closing leg holes avoiding small objects or groceries to fall out. The panel has a rear edge having a tube-shaped portion hingely connected to the swinging rear wall of the compartment. The panel may be urged in an up or down position thanks to a cam element positioned longitudinally on the tube-shaped portion so as to face a vertical wire of the swinging rear wall of the collapsible compartment acting as a spring. The cam is also positioned radially on the tube-shaped portion so as to strike the vertical wire when the seat panel is pivoted from either the down position to the up position or the up position to the down position. The invention is also directed to a shopping cart including the same collapsible compartment.

22 Claims, 6 Drawing Sheets

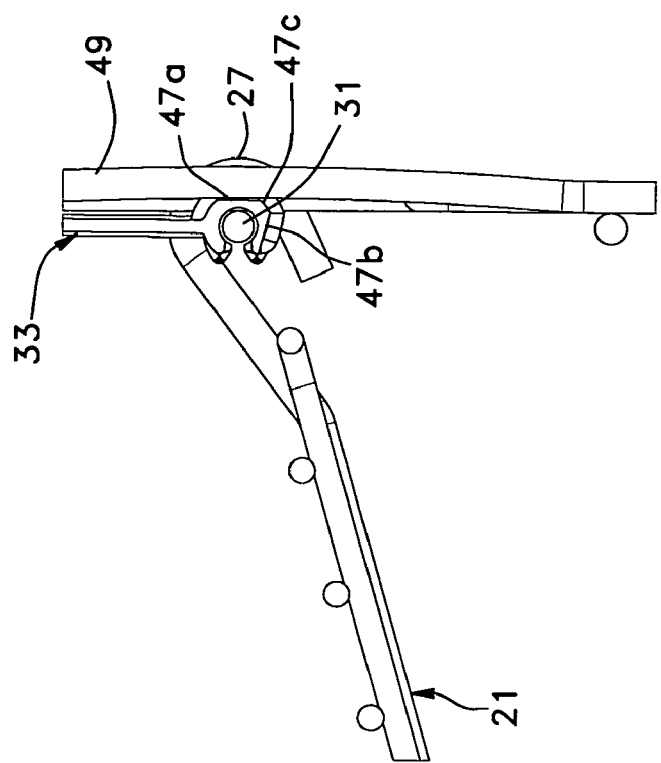
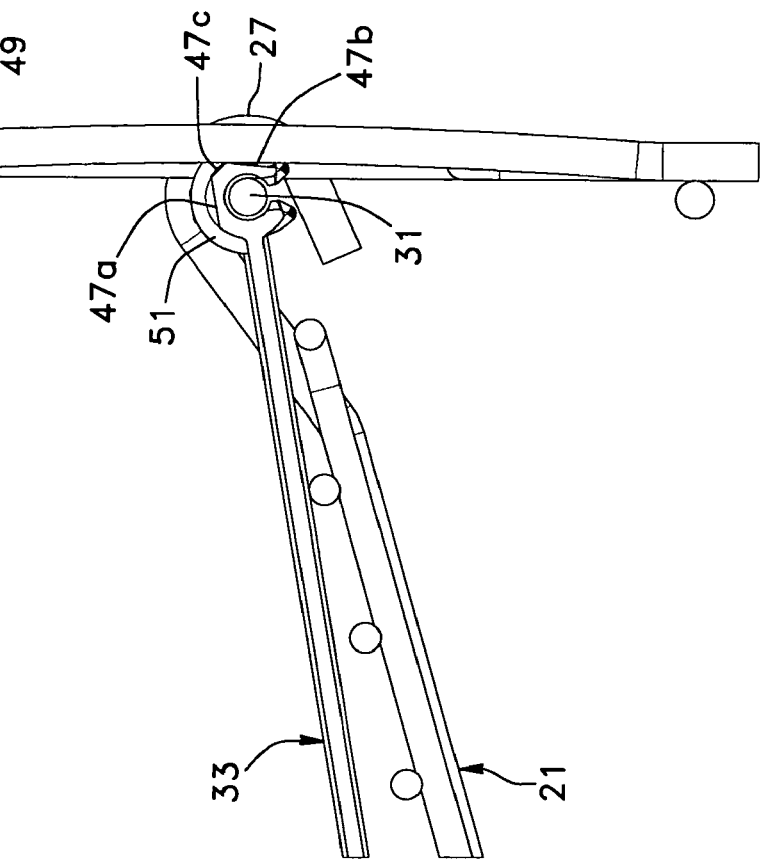

SHOPPING CART AND COLLAPSIBLE COMPARTMENT THEREOF

CROSS REFERENCE TO RELATED APPLICATION

This application claims the benefit of U.S. Provisional Application No. 60/904,899 filed on Mar. 5, 2007.

FIELD OF THE INVENTION

The present invention relates to the field of shopping carts generally used in supermarkets. More particularly, it concerns shopping carts which are provided with a collapsible compartment with leg holes and a seat panel, and wherein a child can be seated. When no child is seated in the compartment, the seat panel may be placed in an up position for closing the leg holes, and then preventing small objects or groceries present in the compartment to fall out. Placed in a down position, the seat panel may provide a better comfort for the seated child.

BACKGROUND OF THE INVENTION

Shopping carts for use at supermarkets or the like are widely known in the art. These carts normally include a large basket supported upon a wheeled frame. The basket is formed with a rear panel that is adapted to pivot into the basket when the front side of another cart is nested, enabling numerous carts to be stored in a compact manner, forming a row. The shopping cart may also comprise more than one basket mounted one on top of the other.

A smaller compartment is generally provided at the cart rear, nearby the handles. As disclosed in U.S. Pat. No. 4,423,882 (Stover et al, 1984), the compartment may be fixed. Otherwise, the compartment collapses when the carts of the like are nested together, such as in U.S. Pat. No. 5,458,347 (Chiv, 1995). As also illustrated in these two U.S. patents, the smaller compartment may further comprise two leg holes for seating a child in the compartment. However, when no child is seated, small objects or groceries present in the compartment may fall out.

To overcome that problem, the small compartment generally comprises a pivotal seat panel that can be placed in an up position for closing the leg holes, or in a down position, for seating the child. The more basic seat panels known in the art have no particular mechanism. Seat panels of this type are hingely connected to the rear side of the basket and tend to naturally return to a down position by gravity and rest on the shelf wall. With this type of seat panel, leg holes present in the rear wall of the shopping cart tend to be open unless the seat panel is put manually in an up position where it covers the legs holes. When the seat panel is not brought in an up position, small objects or groceries inside the collapsible compartment can fall on the ground.

Improved seat panels of the prior art may then comprise a closing mechanism, such as the one disclosed in U.S. Pat. No. 4,537,413 (Rehrig, 1985). Rehrig particularly discloses a closing mechanism which comprises a lifting bar assembly for the seat back panel and child seat (see FIGS. 2 and 3). The assembly comprises a reinforcing rod which cooperates with a lifting rod to automatically raise and lower the child seat in relation to the position of the seat back panel (FIG. 3). Apart from increasing greatly the cart manufacturing costs because of its numerous small parts, this lifting bar assembly may also render the use of the seat panel uneasy.

There are also spring driven seat panels, such as the ones described in U.S. Pat. No. 4,471,90 (Trubiano, 1984); U.S. Pat. No. 5,348,323 (Trubiano, 1994), U.S. Pat. No. 5,368,318 (Rehrig et al., 1994) or U.S. Pat. No. 5,651,557 (De Stefano, 1997). The springs disclosed therein are often spirally wound springs secured to the seat panel to urge the panel against the rear wall of the cart to obstruct the leg holes. As disclosed by Trubiano (1994), the panel may further include a retention means in the form of a hook (FIG. 4, 26) for maintaining the seat panel in the horizontal position.

On its side Rehrig et al. (1994) cited above discloses a seat panel having its rear edge hingely connected to a hinge wire of the cart (FIG. 8, 27) and a holding mechanism incorporated into the hinged connection for positively automatically holding leg opening cover stationary in its upstanding covering position once it is placed therein and until it is manually relieved to return to its non-covering position. The holding mechanism comprises cantilevered leaf springs extending into hinge slots of the seat panel. Each leaf spring has a flat portion and a semi-cylindrical portion extending therefrom. Flat portion is friction fit into a thin flat slot provided in the wall of hinge slot. Semi-cylindrical portion extends into hinge slot and partially surrounds hinge wire. So configured, leaf springs permit leg opening cover to rotate relatively freely through most of its arc. The hinge of the seat also presents a flat portion on its outer round surface (FIG. 7, 53b). As taught on column 7, lines 36 to 37 of this patent, this flat portion provides the necessary clearance for the mounting operation.

U.S. Pat. No. 6,540,240 (Nadeau et al.) discloses a plastic shopping cart having a collapsible compartment and a seat panel. The vertical position of the seat panel is urged thanks to a leaf spring. The shopping cart also comprises a seat shelf including a cam like member for initiating the rotation of the seat panel when the seat shelf and the rest of the compartment are collapsed.

One drawback encountered with certain spring driven seat panels of the prior art is their potential to inadvertently and suddenly close up the holes and pinch the fingers or hand of the customer. Some of these spring driven seat panels may thus be potentially dangerous for the customer.

The spring driven seat panels also have the disadvantage of adding small mechanical parts to the seat panel, such as spring or retaining hook that increase the cart production costs and assembling time. Also these small mechanical parts are prone to break prematurely by fatigue failure or by handling the cart roughly.

As can be appreciated there is still presently a need for a collapsible compartment of a shopping cart, provided with a simple, safe and less expensive mechanism that will allow the seat panel to be readily positioned vertically and closing the leg holes when a shopping cart is taken out from a row of nested shopping carts.

SUMMARY OF THE INVENTION

An object of the present invention is then to provide a shopping cart and a collapsible compartment that satisfy the above-mentioned need. More specifically, an object of the invention is to provide a shopping cart and a collapsible compartment thereof having a very simple structure including a seat panel that will be easily handled by the customer without any risk of pinching.

Accordingly, the present invention is first directed to a collapsible compartment of a shopping cart comprising a swinging rear wall having leg holes and being made of wire meshing including vertical and horizontal wires.

The collapsible compartment also comprises a seat back operatively connected to the swinging rear wall for movement between an open position and a closed position. The open position is where the seat back extends away from the swinging rear wall and the closed position is where the seat back is collapsed against the swinging rear wall.

The collapsible compartment also comprises a shelf wall having a rear edge pivotally connected to the swinging rear wall and a front edge operatively connected to the seat back for movement between a horizontal position, when the seat back is in the open position; and a collapsed position, when the seat back is in the closed position.

The collapsible compartment of the invention further comprises a seat panel, preferably made of a plastic material. The seat panel comprises a rear edge having at least one tube-shaped portion pivotally connected to the above-mentioned swinging rear wall. The seat panel is pivotable between a down position, where the seat panel rests on the shelf wall, and an up position, where the seat panel is covering the leg holes in the swinging rear wall.

The seat panel also comprises a cam element on an outer surface contour of the tube-shaped portion. The cam element is positioned longitudinally on the tube-shaped portion so as to face a vertical wire of the swinging rear wall and is also positioned radially on the tube-shaped portion so as to strike the vertical wire when the seat panel is pivoted from either the down position to the up position or the up position to the down position, whereby the seat panel is urged in either the up or the down position.

The invention is also directed to a shopping cart comprising a wheeled frame, a basket mounted elevated on the frame and including a bottom wall, two side walls, a front wall and a swinging rear wall to permit nesting the cart with like shopping carts. The swinging rear wall has leg holes made of wire meshing including vertical and horizontal wires and is part of a collapsible compartment also present inside the basket. The collapsible compartment is as defined above.

Advantageously, in comparison with most of the shopping carts of the prior art, the shopping cart and collapsible compartment of the present invention do not need a mechanical helicoid or leaf spring for moving up the seat panel and urge it against the rear swinging wall or the shelf wall. Therefore, the seat panel cannot inadvertently spring up and pinches the fingers of the customer. The customer himself decides to manually close up the seat panel. However, the closing movement is helped since the cam element abuts on the vertical wire of the cart playing the role of springs. Indeed, the metallic vertical wire of the cart has an intrinsic elasticity and plays the role of the spring. The cam element also allows the seat panel to remain in the up position and when the customer decides to push down the seat panel, here again the cam element abutting on the vertical wires will help finalising this movement.

Advantageously, the seat panel does not need hooks or the like for retaining the panel in the up or down position, since the cam element cannot pass the vertical wire without a little pressure exerted by the customer on the panel.

Another advantage of the invention can be better understood by detailing the method of using the collapsible compartment. The action of nesting shopping carts into each other will automatically close the collapsible compartment and push up the seat panel into the up position closing the leg holes. When the customer will pull out the shopping cart from the row and open the collapsible compartment, the cam element will maintain the seat panel in the up position, closing the leg holes. This position is always privileged in comparison to the down position of the seat panel, since a majority of customers uses the collapsible compartment as an auxiliary basket, not a child seat, and prefers to see the leg holes closed by the seat panel for preventing small objects from falling down on the ground. Otherwise, the seat panel may be merely put in the down position by exerting a slight pressure on the seat panel in order to make it pivot about the horizontal wire of the rear swinging wall.

The present invention and its advantages will be better understood and apparent upon reading the following detailed description made with reference to the accompanying drawings.

BRIEF DESCRIPTION OF THE DRAWINGS

FIGS. 6A and 6B are cross-sectional views of the seat panel taken along line A-A in FIG. 5, shown in its down position on FIG. 6A and shown in its up position on FIG. 6B.

DETAILED DESCRIPTION OF PREFERRED EMBODIMENTS

Figure 1:
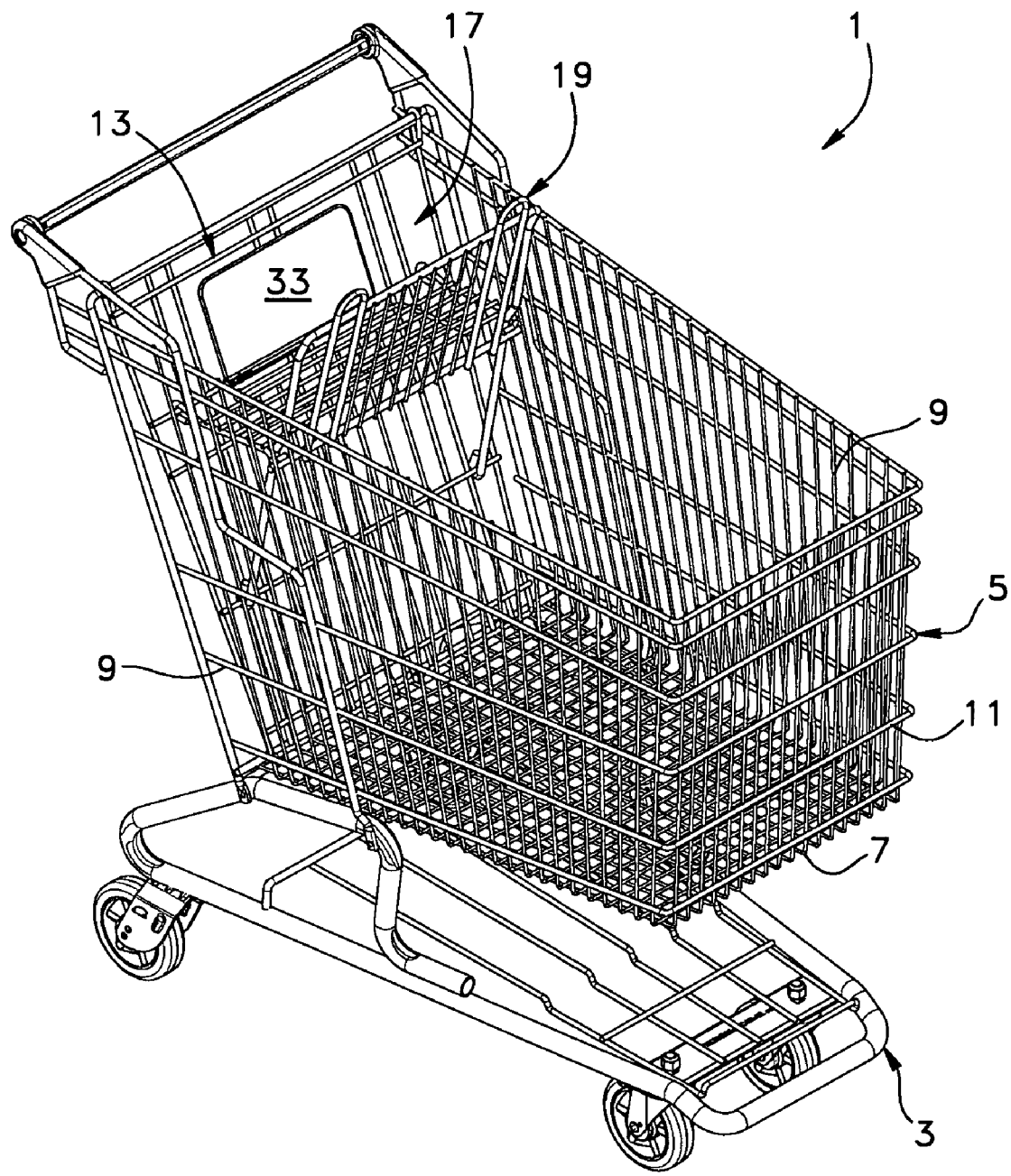
FIG. 1 is a perspective view of a shopping cart according to a preferred embodiment of the invention.

According to a preferred embodiment of the present invention, as the one illustrated on FIG. 1, a shopping cart (1) generally comprises a wheeled frame (3); a basket (5) mounted elevated on the frame and including a bottom wall (7), two side walls (9), a front wall (11) and a swinging rear wall (13) to permit nesting the cart with like shopping carts. As illustrated, the frame and walls forming the cart are generally made of metallic tubes and vertical or horizontal wires intermingling for forming a mesh. It is however worth nothing that in another embodiment of the invention, not illustrated, other types of material, such as polymeric material, and other sort of panels can be used, such as solid panels or panels pitted with holes for the side walls, the front wall and the bottom wall.

Figure 2A:
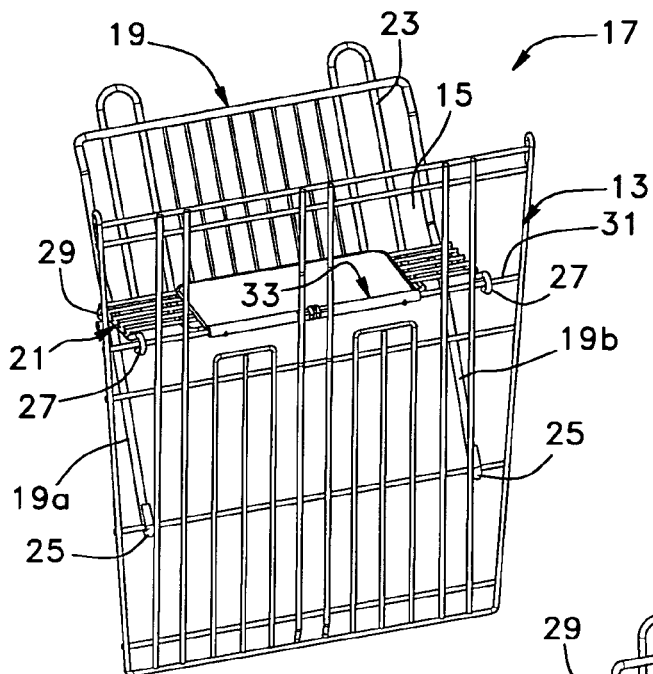
FIGS. 2A, 2B and 2C are perspective views of the collapsible compartment according to a preferred embodiment of the invention, respectively showing the compartment opened and the seat panel resting on the shelf (FIG. 2A); the compartment closed and the seat panel covering the leg holes in the rear swinging wall (FIG. 2B); and the compartment opened and the seat panel still covering the leg holes in the rear swinging wall (FIG. 2C).
Figure 2B:
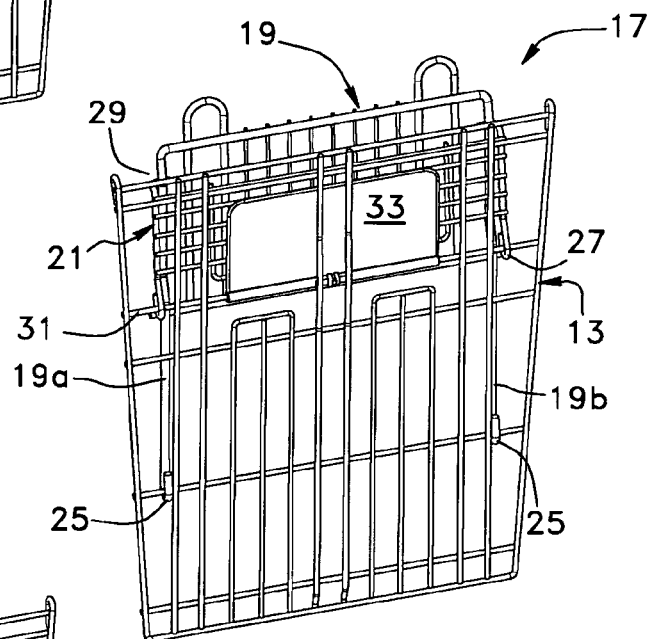
Figure 2C:
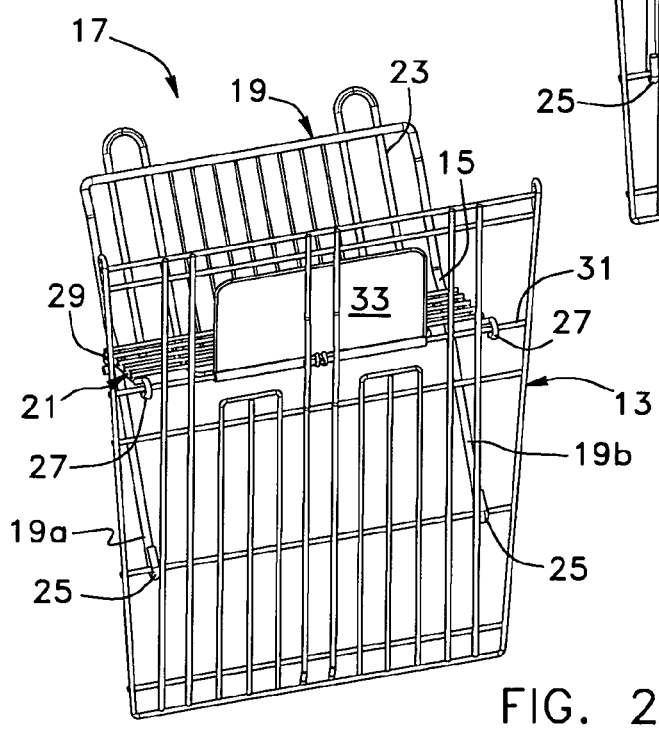

As closely illustrated on FIGS. 2A to 2C, the swinging rear wall (13) has leg holes (15) allowing a child to be seated in a collapsible compartment (17) provided into the basket (5) (FIGS. 1 and 2A).

The collapsible compartment (17) is formed by the swinging rear wall (13) of the basket, a seat back (19) and a shelf wall (21).

As illustrated on FIGS. 2A to 2C, the seat back (19) may be made of metallic wires (23). The seat back is operatively connected to the swinging rear wall for movement between an open position (FIGS. 2A and 2C), where the seat back extends away from the swinging rear wall (13), and a closed position (FIG. 2B), where the seat back is collapsed against the swinging rear wall (13). In the embodiment illustrated, the seat back

(13) is made of a wire frame comprising two side edge wires (19a,19b) having their bottom end (25) pivotally mounted to the swinging rear wall (13).

As aforesaid, the collapsible compartment (17) also comprises a shelf wall (21), allowing a child to seat in the open collapsible compartment or for holding groceries. As can be appreciated, the shelf wall (21) is also holding the seat back when the compartment is in the open position (FIG. 2A). For doing so, the shelf wall (21) has a rear edge (27) pivotally connected to the swinging rear wall (13), and a front edge (29) operatively connected to the seat back (19) so as to allow the seat back to move between its open and closed position. More specifically, the front edge (29) of the shelf wall (21) is connected to the two side edges of wires of the seat back (19a, 19b) in a slidable manner known by a person skilled in the art, and the rear edge (27) of the shelf wall (21) is pivotally connected to one of the horizontal wires (31) of the swinging rear wall (13) in a manner also known by a person skilled in the art. As illustrated on FIG. 2, the shelf wall (21) is then pivotable between a horizontal position when the seat back (19) is in the open position and a collapse position when the seat back is brought to its closed position (see FIG. 2B). When the shelf wall (21) is in the horizontal position, the child may be seated thereon with the legs going through the leg holes (15); the child's back supported by the seat back (19).

According to another embodiment of the invention not illustrated herein, the shopping cart may comprise more than one basket mounted one on top of the other. Preferably, the shopping cart may comprise two baskets, including a superior basket located above an inferior basket. In that particular case, the bottom edge of the seat back is pivotally connected to the front edge of the shelf wall, and the cart further comprises two arms connecting the top edge of the seat back to the swinging rear wall.

When there is no need to use the collapsible compartment (17), the compartment may be closed by putting it in the collapsed position, such as the one illustrated on FIG. 2B. Then, the seat back (19) and the shelf wall (21) are collapsed against the swinging rear wall (13).

A child seated in the compartment, such as the one illustrated in the enjoined Figures, may feel a certain discomfort, and that even more if the shelf wall is made of wires. Furthermore, the collapsible compartment in its open position may be used by the customer as an auxiliary basket for collecting smaller or fragile objects or groceries. The presence of the leg holes may be a problem in that small object or groceries can pass through the holes and fall on the ground. For these reasons, the collapsible compartment also comprises a seat panel (33).

As illustrated on FIG. 2A, when the collapsible compartment is open, and is intended to seat a child, the seat panel (33) is positioned on the shelf wall (21) and as such provides a more comfortable seat for the child. As illustrated on FIG. 2C, when no child is present, the seat panel (33) may be placed in an up position and as such obstructing the leg holes (15). The seat panel (33) is generally made of solid material such as metal, wood or plastic. Preferably, the seat panel is made of plastic or polymeric material. More preferably, the seat panel is made of a deformable plastic material of any kind like extruded polymeric material well known in the art. Even more preferably, the seat panel is a single integrally moulded plastic panel, such as the one illustrated on FIG. 3.

Figure 3:
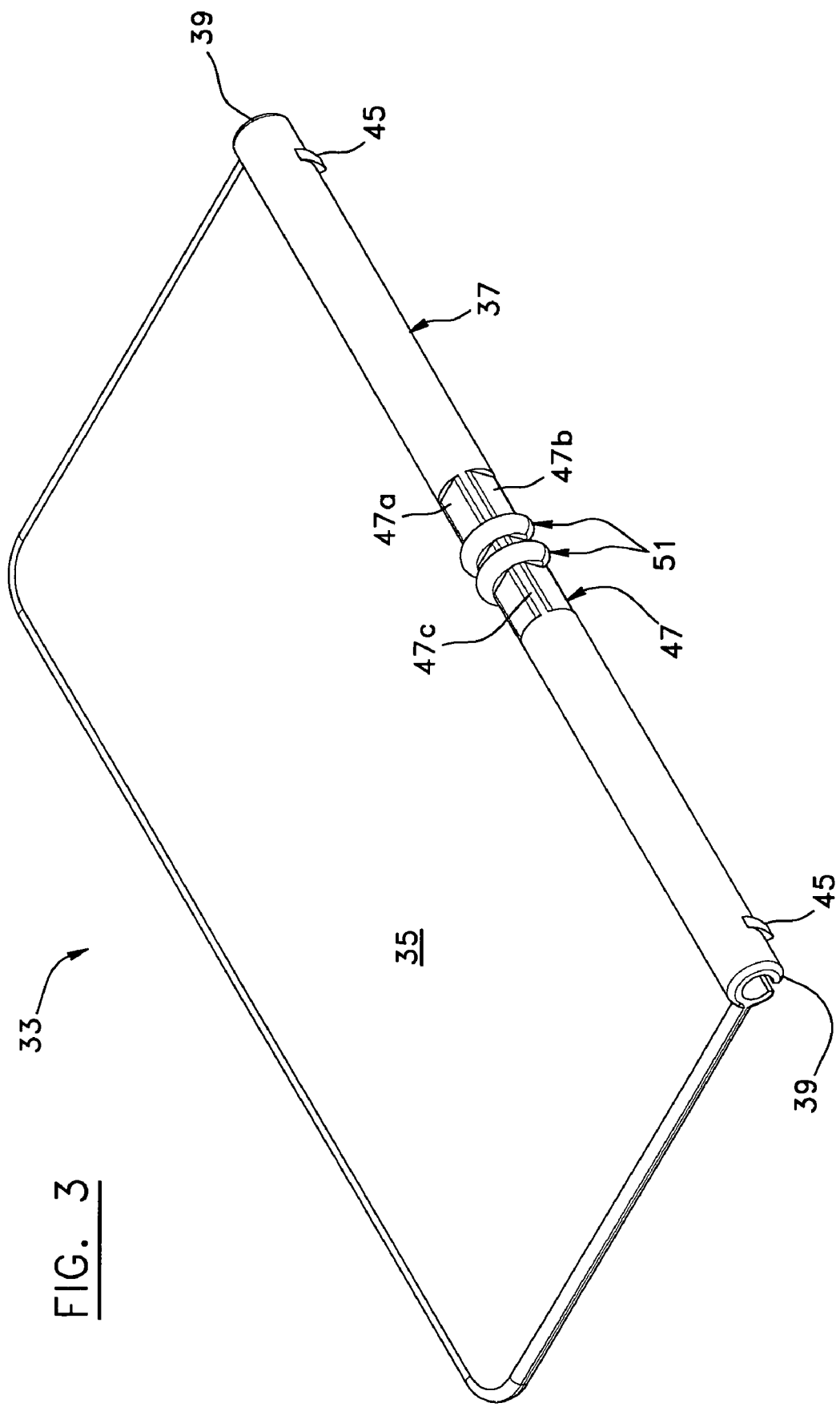
FIG. 3 is a perspective view of the seat panel shown in FIGS. 2A, 2B and 2C.

The seat panel (33), as the one illustrated in FIGS. 2 and 3, comprises a seating surface (35), preferably smooth, and a rear edge (37) having at least one tube-shaped portion (39).

The tube-shaped portion (39) is hingely connecting the seat panel (33) to one of the horizontal wires (31) of the swinging rear wall (13). Preferably, the same horizontal wire may be used for connecting the seat panel (33) and the shelf wall (21) to the swinging rear wall (13) of the cart. It is however worth nothing that in another embodiment of the invention, not illustrated, the panel and the shelf may be connected to two different horizontal wires, as soon as the two wires are close and parallel. An example of connection using two different wires is illustrated in U.S. Pat. No. 5,348,323 (Trubiano, 1994).

The seat panel (33) may then revolve about the horizontal wire (31) between a down position (FIG. 2A), where the seat panel rests on the shelf wall (21) and an up position where the seat panel (33) is covering the leg holes in the rear swinging wall (FIG. 2C) or where the compartment is closed and the back seat is collapsed (FIG. 2B).

Preferably, as illustrated by the enclosed Figures, the tube-shaped portion (39) of the seat panel (33) consists of one tube-shaped portion spanning the rear edge (37). It is however worth nothing that in another embodiment of the invention, not illustrated, only portions of the rear edge can be tube-shaped, as long as it allows the panel (33) to be pivotally mounted to the horizontal wire (31).

As aforesaid, the seat panel may be made of a deformable plastic material. As illustrated on FIG. 4, the rear edge (37) of the seat panel (33) may preferably comprise a slot (41) in a bottom side thereof. The slot spans the length of the tube-shaped portion. The slot allows the seat panel to be snapped onto the horizontal wire (31) by material deformation and then fixed to the swinging rear wall (13). If a more rigid material is used, the seat panel could be installed by other means, for example by sliding it on the horizontal wire prior to its attachment to the rear wall (not illustrated).

Alternatively, in another embodiment not illustrated the seat panel can be pivotally connected to the swinging rear wall using means well known in the art such as two facing support rods of the swinging rear supporting the extremities of the tube-shaped portion (39) of the rear edge (37).

Figure 4:
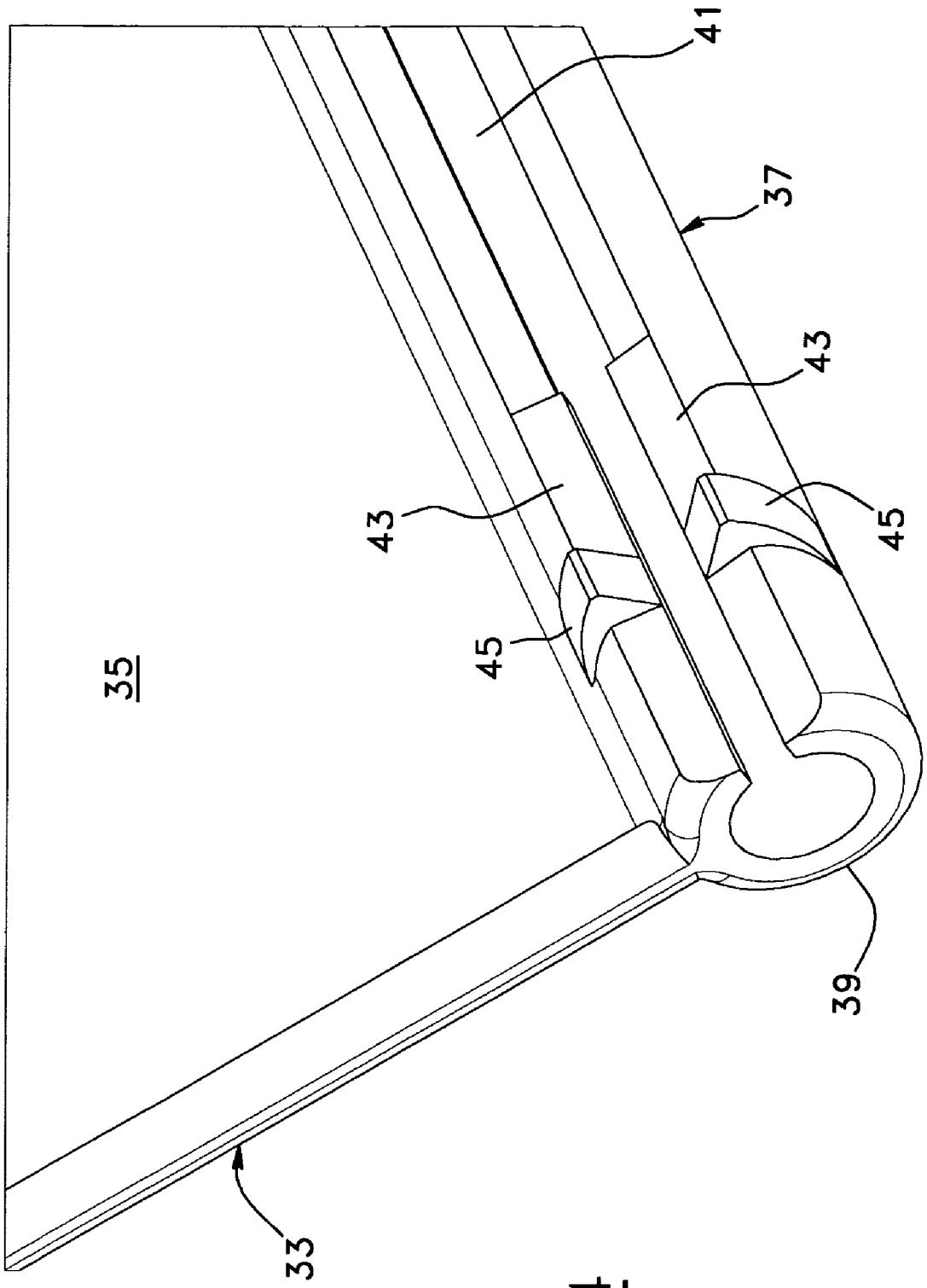
FIG. 4 is an enlargement of a portion of the seat panel of FIG. 2, showing more clearly the tube-shaped portion provided with a slot, reinforcement elements and guide elements.

As also illustrated on FIG. 4, the rear edge may further comprise reinforcement elements (43) located along the slot (41), preferably one reinforcement (43) on each rims of the slot (41) at each extremity of the rear edge (37). These reinforcements can be located at any suitable location along the rear edge. It has to be understood that these reinforcements render quite difficult the removing of the seat panel, insuring a secure connection of the panel to the cart.

As also illustrated on FIG. 4, the rear edge (37) may also comprise a guide element (45), preferably more than one, located along the slot (41) for guiding the rear edge (37) onto the horizontal wire (31) and facilitating the snapping of the seat panel (33).

Figure 5:
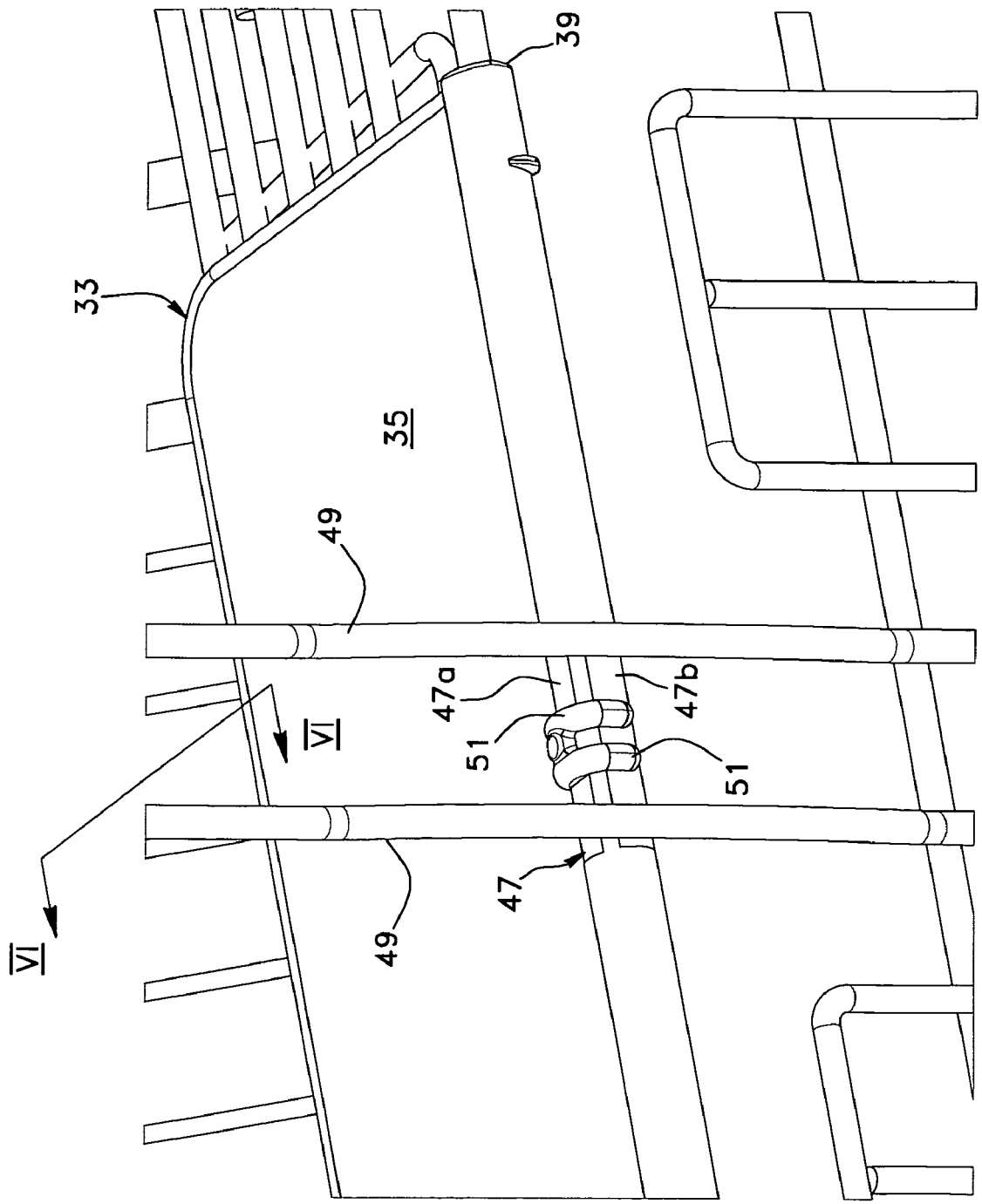
FIG. 5 is a partial and enlarged view of FIG. 2A, providing a closer view of the cam element of the panel.

As also illustrated on FIGS. 3 and 5, the rear edge (37) of the seat panel comprises a cam element (47) (actually two in the embodiment illustrated) on the outer surface contour of the tube-shaped portion (39). As shown in FIG. 5, each cam element is positioned longitudinally on the tube-shaped portion so as to face a respective vertical wire (49) of the swinging rear wall (13). Each cam element is also positioned radially on the tube-shaped portion so as to strike said vertical wire when the seat panel is pivoted from either the down position to the up position or the up position to the down position as illustrated on FIGS. 6A and 6B. The presence of the cam element allows the seat panel to be urged in either the up or the down position.

As illustrated on FIG. 3, the preferred embodiment of the invention has two cam elements (47) that have been curved or moulded in the outer surface of the tube-shaped portion in a median region of the rear edge (37). By median region, it is meant extending toward the middle, whether exactly at the middle or close to the middle. It is worth noting that the seat panel (33) could include any number of cam elements, according to the needs of the design.

Each of the two cams of the preferred embodiment takes the form of two flat sections on the outer surface contour of the tube-shaped portion. These two flat sections are, as illustrated, positioned radially one after the other on the tube-shaped portion. A first flat section (47a) is positioned on a top side of the tube-shaped portion and a second flat section (47b) is positioned on a rear side of the tube-shaped portion.

As better illustrated on FIG. 3, the surface (47c) of the tube-shaped portion (39) radially located between the two flat sections (47a, 47b) of the cam element (47) is a curved surface having the same radius as the tube-shaped portion (39). According to another embodiment of the invention not illustrated here, the surface (47c) located between two flat sections could simply be a corner, meaning that the two flat sections are directly in contact.

By cam element, it is meant a projecting part of a rotating wheel or shaft that strikes a lever at one or more points on its circular paths. In the present case, the rear tubular edge of the seating panel would represent the rotating shaft, whereas the vertical wire of the swinging rear panel would represent the lever stroke by the curved projecting surface between the two flat sections of the cam element.

As illustrated on FIGS. 6A and 6B, the cam element has been designed to firmly hold the seat panel (33) either in the down position (FIG. 6A) or in the up position (FIG. 6B). Indeed, a pressure is exerted on the cam elements by the vertical wire (49) of the rear swinging wall (13) which acts as a spring and abuts the cam element.

The illustrated preferred embodiment has two vertical wires (49) defining a separation between the two leg holes (15). It has to be understood that there could be any number of vertical wires or any equivalent mean able to exert a pressure on the cam elements (47). The wires are always slightly bent, in a non permanent manner, by the presence of the seat panel. When the seat panel (33) is pivoted about the horizontal wire (31), the vertical wires (49) sustain a greater deformation. This deformation favours a return to a more stable position of the seat panel, either the down or the up position.

As illustrated on FIGS. 3 and 5, the seat panel may further comprise a flange (51) on the tube-shaped portion sized to abut a side face of the vertical wire(s) (49) to prevent the seat panel from sliding sideways on the horizontal wire (31). The preferred embodiment illustrated therein presents two flanges (51) aligned between both vertical wires (49). The two cam elements (47) are then located in a median region of the rear edge (37) with the two flanges (51) located between the two cam elements (47). It has to be understood that other arrangements could be considered for preventing the seat panel from sliding sideways, as apparent to a person skilled in the art.

In the preferred embodiment illustrated in the Figures, the shopping cart (1) has only one basket (5). The seat back (19) of the collapsible compartment (17) has then a bottom edge (25) pivotally connected to the swinging rear wall (13) for movement between the open and close positions. Then, the front edge (29) of the shelf wall (21) is connected in a slidable manner to the seat back (19).

As illustrated to in the Figures, the rear edge (27) of the shelf wall (21) is pivotally connected to one of horizontal wires of the swinging rear wall (13). Preferably, the horizontal wire connecting the shelf wall (21) and the horizontal wire connecting the seat panel (33) are the same horizontal wire (31).

Turning now to FIGS. 2 and 6, wherein the collapsible compartment (17) is opened with the seat panel in the down position (FIG. 2A or 6A), it can be appreciated that the action of nesting shopping carts into each other will close the collapsible compartment and push the seat panel (33) into the up position (FIG. 2B). The cam element (47) then will maintain the seat panel (33) in the up position, even when the collapsible compartment is re-opened (FIG. 2C or 6B), for instance when a person pulls the shopping cart (1) from the row of shopping carts. Having the leg holes (15) of the collapsible compartment closed prevents small objects from falling down on the ground, if the collapsible compartment is used to put groceries or other objects having a size smaller than the leg holes.

When a child needs to be seated into the collapsible compartment, the seat panel (33) has to be moved to the down position, where it rests on the shelf wall (21), by exerting a slight pressure on the seat panel (33) in order to make it pivot about the horizontal wire (31) of the rear swinging wall (13). In doing so, the rounded area (47c) of the cam element abuts against the vertical wire (49). The cam element (47) can have as many areas as there are positions for the seat panel.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A collapsible compartment of a shopping cart, the collapsible compartment comprising:
    a swinging rear wall having leg holes and being made of wire meshing including vertical and horizontal wires;
    a seat back operatively connected to the swinging rear wall for movement between an open position where the seat back extends away from the swinging rear wall, and a closed position where the seat back is collapsed against the swinging rear wall;
    a shelf wall having a rear edge pivotally connected to the swinging rear wall and a front edge operatively connected to the seat back for movement between a horizontal position, when the seat back is in the open position; and a collapsed position, when the seat back is in the closed position; and
    a seat panel comprising:
        a rear edge having at least one tube-shaped portion pivotally connected to the swinging rear wall, whereby the seat panel is pivotable between a down position where the seat panel rests on the shelf wall and an up position where the seat panel is covering the leg holes in the swinging rear wall; and
        a cam element on an outer surface contour of the tube-shaped portion, the cam element being positioned longitudinally on said tube-shaped portion so as to face a vertical wire of the swinging rear wall and being also positioned radially on the tube-shaped portion so as to strike said vertical wire when the seat panel is pivoted from either the down position to the up position or the up position to the down position, whereby the seat panel is urged in either the up or the down position.

2. The collapsible compartment according to claim 1, wherein the outer surface of the tube-shaped portion is curved and the cam comprises a flat section in the outer surface contour on a top side of the tube-shaped portion.

3. The collapsible compartment according to claim 1, wherein the outer surface of the tube-shaped portion is curved and the cam comprises two flat sections in the outer surface contour, the two flat sections being positioned radially one after the other on the tube-shaped portion, a first one of said flat sections being positioned on a top side of the tube-shaped portion and a second one of said flat sections being positioned on a rear side of the tube-shaped portion.

4. The collapsible compartment according to claim 3, wherein the rear edge of the seat panel is hingely connected to one of the horizontal wires of the swinging rear wall.

5. The collapsible compartment according to claim 4, wherein the seat panel further comprises a flange on the tube-shaped portion sized to abut a side face of said vertical wire to prevent the seat panel from sliding sideways on the horizontal wire.

6. The collapsible compartment panel according to claim 5, wherein the at least one tube-shaped portion of the seat panel consists of one tube-shaped portion spanning the rear edge.

7. The collapsible compartment according to claim 6, comprising two of said cam element located in a median region of the rear edge with said flange being located between the two cam elements.

8. The collapsible compartment according to claim 7, wherein the tube-shaped portion is made of a deformable plastic material and comprises a slot in a bottom side thereof spanning the length of the tube-shaped portion, the slot allowing the seat panel to be snapped onto the horizontal wire by material deformation and then fixed to the swinging rear wall.

9. The collapsible compartment according to claim 8, wherein the rear edge of the seat panel further comprises at least one reinforcement element located along the slot.

10. The collapsible compartment according to claim 9, wherein the rear edge of the seat panel further comprises at least one guide element along the slot for guiding the rear edge onto the horizontal wire and facilitating the snapping of the seat panel.

11. The collapsible compartment of claim 10, wherein the rear edge of the shelf wall is pivotally connected to said one of the horizontal wires hingely connecting the seat panel to the swinging rear wall.

12. A shopping cart comprising:
a wheeled frame;
a basket mounted elevated on the frame and including a bottom wall, two side walls, a front wall and a swinging rear wall to permit nesting the cart with like shopping carts, the swinging rear wall having leg holes and being made of wire meshing including vertical and horizontal wires; and
a collapsible compartment inside the basket including:
the side walls of the basket,
the swinging rear wall of the basket,
a seat back operatively connected to the swinging rear wall for movement between an open position where the seat back extends away from the swinging rear wall, and a closed position where the seat back is collapsed against the swinging rear wall;
a shelf wall having a rear edge pivotally connected to the swinging rear wall and a front edge operatively connected to the seat back for movement between a horizontal position, when the seat back is in the open position; and a collapsed position, when the seat back is in the closed position; and
a seat panel comprising:
a rear edge having at least one tube-shaped portion pivotally connected to said swinging rear wall, whereby the seat panel is pivotable between a down position where the seat panel rests on the shelf wall and an up position where the seat panel is covering the leg holes in the swinging rear wall; and
a cam element on an outer surface contour of the tube-shaped portion, the cam element being positioned longitudinally on said tube-shaped portion so as to face a vertical wire of the swinging rear wall and being also positioned radially on the tube-shaped portion so as to strike said vertical wire when the seat panel is pivoted from either the down position to the up position or the up position to the down position, whereby the seat panel is urged in either the up or the down position.

13. The shopping cart according to claim 12, wherein the outer surface of the tube-shaped portion is curved and the cam comprises two flat sections in the outer surface contour, the two flat sections being positioned radially one after the other on the tube-shaped portion, a first one of said flat sections being positioned on a top side of the tube-shaped portion and a second one of said flat sections being position on a rear side of the tube-shaped portion.

14. The shopping cart according to claim 13, wherein the rear edge of the seat panel is hingely connected to one of the horizontal wires of the swinging rear wall.

15. The shopping cart according to claim 14, wherein the seat panel further comprises a flange on the tube-shaped portion sized to abut a side face of said vertical wire to prevent the seat panel from sliding sideways on the horizontal wire.

16. The shopping cart according to claim 15, wherein the at least one tube-shaped portion of the seat panel consists of one tube-shaped portion spanning the rear edge.

17. The shopping cart according to claim 16, comprising two of said cam element located in a median region of the rear edge with said flange being located between the two cam elements.

18. The shopping cart according to claim 17, wherein the tube-shaped portion is made of a deformable plastic material and comprises a slot in a bottom side thereof spanning the length of the tube-shaped portion, the slot allowing the seat panel to be snapped onto the horizontal wire by material deformation and then fixed to the swinging rear wall.

19. The shopping cart according to claim 18, wherein the rear edge of the seat panel further comprises at least one reinforcement element located along the slot.

20. The shopping cart according to claim 19, wherein the rear edge of the seat panel further comprises at least one guide element along the slot for guiding the rear edge onto the horizontal wire and facilitating the snapping of the seat panel.

21. The shopping cart according to claim 20, wherein the rear edge of the shelf wall is pivotally connected to said one of the horizontal wires hingely connecting the seat panel to the swinging rear wall.

22. A shopping cart comprising:
a wheeled frame;
a basket mounted elevated on the frame and including a bottom wall, two side walls, a front wall and a swinging rear wall to permit nesting the cart with like shopping carts, the swinging rear wall having leg holes and being made of wire meshing including vertical and horizontal wires; and
a collapsible compartment inside the basket including:
the side walls of the basket,
the swinging rear wall of the basket,
a seat back operatively connected to the swinging rear wall for movement between an open position where the seat back extends away from the swinging rear wall, and a closed position where the seat back is collapsed against the swinging rear wall;

a shelf wall having a rear edge pivotally connected to a horizontal wire of the swinging rear wall and a front edge slidely connected to the seat back for movement between a horizontal position, when the seat back is in the open position; and a collapsed position, when the seat back is in the closed position; and a seat panel made of a deformable plastic material and comprising:

a rear edge having one tube-shaped portion spanning the rear edge and hingely connected the horizontal wire of said swinging rear wall, whereby the seat panel is pivotable between a down position where the seat panel rests on the shelf wall and an up position where the seat panel is covering the leg holes in the swinging rear wall;

two cam elements located in a median region of the rear edge and positioned longitudinally on an outer surface contour of the tube-shaped portion, so as to both face a respective vertical wire of the swinging rear wall, each of said cam elements being curved to form two flat sections in the outer surface contour positioned radially one after the other on the tube-shaped portion such that a first one of said flat sections is positioned on a top side of the tube-shaped portion and a second one of said flat sections is positioned on a rear side of the tube-shaped portion, the two cam elements striking said vertical wires when the seat panel is pivoted from either the down position to the up position or the up position to the down position, whereby the seat panel is urged in either the up or the down position;

at least one flange located between the two cam elements on the tube-shaped portion and sized to abut a side face of said vertical wire to prevent the seat panel from sliding sideways on said one of the horizontal wires;

a slot in a bottom side of the rear edge spanning the length of the tube-shaped portion, the slot allowing the seat panel to be snapped onto the horizontal wire by material deformation and then hingely fixed to the horizontal wire of the swinging rear wall;

at least one reinforcement element located along the slot; and at least one guide element along the slot for guiding the rear edge onto the horizontal wire and facilitating the snapping of the seat panel.

* * * * *